United States Patent Office 3,787,461
Patented Jan. 22, 1974

3,787,461
ORGANOMETALLIC DERIVATIVES OF
PERFLUOROCYCLOALKENES
Joseph D. Park, Boulder, Colo., and Sam Kwon Choi, Stamford, Conn., assignors to Minnesota Mining and Manufacturing Company, St. Paul, Minn.
No Drawing. Continuation-in-part of abandoned application Ser. No. 8,687, Feb. 4, 1970. This application Aug. 25, 1971, Ser. No. 174,991
Int. Cl. C07f 7/00, 3/10
U.S. Cl. 260—429 R
4 Claims

ABSTRACT OF THE DISCLOSURE

Organometallic compounds in which olefinically unsaturated fluoroalicyclic groups are bonded to two metal radicals through two of the vinylic carbon atoms. The compounds can be prepared by metal interchange with an alkali metal derivative of the fluoroalicyclic olefin. The compounds are useful as thermally and hydrolytically stable plasticizers for polymers, as lubricants and as lubricant additives for cryogenic equipment.

BACKGROUND OF THE INVENTION

This is a continuation-in-part application of the copending application Ser. No. 8,687, filed Feb. 4, 1970 now abandoned.

The present invention relates to organometallic compounds which have bonded to at least one polyvalent hetero atom therein, at least one olefinically unsaturated fluoroalicyclic group through at least one of the vinylic carbon atoms.

The useful hetero atoms are the polyvalent metals of the subgroups 4a, 5a, and 2b of the periodic table as listed on pages 58 and 59 of Lange's Handbook, Handbook Publishers, Sandusky, Ohio, 1946.

Saturated perfluoroalkyl derivatives are well known in the art and certain derivatives, such as trifluoromethyl organometallic compounds are described in the literature. See, for example, P. M. Treichel and F. G. A. Stone, Advances in Organometallic Chemistry, p. 147, Academic Press, New York, 1964. These saturated compounds, however, have generally been found to be both thermally and hydrolytically unstable. Certain perfluoroalkyl derivatives having two organosulfur bonds have been described in Krespan and England, Journal of the American Chemical Society, volume 33, No. 5, page 1850, May 1968. No literature is known, however, describing two organometallic bonds and the synthesis of such compounds are completely unrelated to the process described in Krespan et al.

SUMMARY OF THE INVENTION

According to the present invention, novel fluoroalicyclic vinylic organometallic compounds are provided which have been found generally to possess a much higher degree of thermal and hydrolytic stability than the saturated analogs. The compounds have bonded to at least one polyvalent hetero atom therein, at least one unsaturated fluoroalicyclic group through at least one of the vinylic carbon atoms.

The olefinically unsaturated fluoroalicyclic groups are mono-olefinic cyclic compounds having 4, 5, or 6 carbon atoms in which each of the carbon atoms not carrying a double bond are difluoromethylene (—$CF_2$—) carbon atoms and having the non-ring valence of at least one vinylic carbon atom (i.e., a ring carbon atom carrying a double bond) which is bonded to the metal.

The compounds of the invention may be illustrated by the formula:

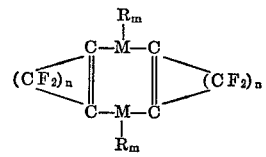

wherein M is a polyvalent hetero atom selected from the group consisting of subgroups 4a, 5a, and 2b of the periodic table; R is alkyl, cycloalkyl, or aryl; $m$ is the valence of said hetero atom minus 2, and $n$ is 2, 3, or 4.

The method for preparing compounds of the invention comprises the steps of reacting a compound, preferably a diiodide, having the formula:

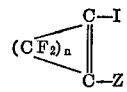

wherein Z is Li or I and $n$ is 1, 2, or 3, with a lithium alkyl at a temperature from about $-80°$ C. to $0°$ C. for 1–4 hours to produce an organolithium compound; and reacting the organolithium compound with a stoichiometric excess of a compound having the formula $RmMX_2$, wherein R is alkyl, cycloalkyl or aryl; M is a polyvalent hetero atom selected from the group consisting of subgroups 4a, 5a, and 2b of the periodic table; $m$ is the valence of said hetero atom minus 2; and finally isolating the product.

The compounds of the present invention contain no more than one double bond per ring. The ring is bonded to two polyvalent metal atoms. The metal atoms, depending on its valence, is bonded to two rings and additionally to a sufficient number of organic radicals such as $CH_3$, $C_4H_9$ to take care of the remaining valences.

The preferred metals used in preparing the compounds of the present prevention are the metals in groups 2b, 4a and 5a of the periodic table, especially mercury, and the metals of group 4a. Illustrative of such metals are mercury, titanium, arsenic, germanium, tin and lead.

Starting compounds may be prepared by conventional methods, in some cases by dimerization or codimerization reactions, followed by dehalogenation or dehydrohalogenation known in the art. Still others may be prepared by decarboxylation of saturated fully fluorinated cyclic carboxylic acids to the corresponding cycloalkene compound as described in U.S. Pat. No. 2,746,997, followed by conversion of the cycloalkene to a mono or dichloro derivative, as described in U.S. Pat. No. 3,193,587.

Other starting compounds are prepared by first, reacting in gas phase, hydrogen bromide with a fluoroalicyclic compound as hereinabove described, in the presence of a metal salt-active carbon catalyst, thereby effecting the replacement of the two vinylic chloride atoms by bromine. The brominated product may be further reacted with alkali metal iodide, the reactants being dissolved in dimethylformamide, thereby effecting a substitution of at least one vinylic bromine atom by iodine. The preparation of compounds where only one metallic bond is present is described in Park et al., J. Am. Chem. Soc., 33, 33 (1968). That particular reference, however, is limited to mono-metallic bonds and does not suggest di-metallic bonds. The starting compounds are reacted with a lithium alkyl to produce an organolithium intermediate compound. To the latter, a metallic halide, dissolved in diethylether, is added and the compounds of the invention are crystallized from the solution.

The following compounds are illustrative of those prepared by the above procedure:

TABLE 1

| Starting compound | Metallic halide | Organometallic compound product | Melting point (°) |
|---|---|---|---|
| (F,I cyclobutene) | $(CH_3)_2GeCl_2$ | bis-Ge(CH_3)_2 bridged difluorocyclobutene dimer | 161–162 |
| (F,I cyclobutene) | $CH_3AsCl_2$ | bis-As(CH_3) bridged difluorocyclobutene dimer | 127–128 |
| (F,I cyclobutene) | $(CH_3)_2SnCl_2$ | bis-Sn(CH_3)_2 bridged difluorocyclobutene dimer | 199 |
| (F,I cyclobutene) | $(C_6H_5-)_2PCl_2$ | bis-P(C_6H_5) bridged difluorocyclobutene dimer | ---------- |
| (F,I cyclobutene) | $HgCl_2$ | bis-Hg bridged difluorocyclobutene dimer | 80.5–81.5 |
| (F,I cyclobutene) | $HgCl_2$ | bis-Hg bridged difluorocyclobutene trimer | ---------- |
| (F,I cyclobutene) | $HgCl_2$ | bis-Hg bridged difluorocyclobutene dimer | 100–101 |

The iodo compounds, heretofore described in the general preparation of the compounds of the present invention, are preferable to the chloro and bromo compounds as the starting materials because of the ease of preparing the dilithio derivatives.

The compounds described herein are useful as thermally and hydrolytically stable plasticizers for polymers, as lubricants and as lubricant additives for cryogenic equipment. The compounds also possess biocidal properties.

The invention will be further understood by reference to the following illustrative, but non-limiting examples, in which all parts are by weight unless otherwise noted.

EXAMPLE 1

Reaction of 1,2-dichloro-3,3,4,4-tetrafluorocyclobutene-1 with hydrogen bromide

The reaction was accomplished by sweeping a mixture of the olefin and excess hydrogen bromide through a 100 cm. x 2.5 cm. Pyrex tube packed with a 25:75 calcium sulfate:activated carbon catalyst heated to approximately 290° C. with a contact time of about 10 seconds. Reaction temperatures of 230–300° C. are useful, with the lower temperatures requiring longer contact times. The catalyst was prepared by grinding and classifying activated carbon of the gas carbon type and anhydrous calcium sulfate to 16 mesh size, mixing thoroughly, packing in the tube and activating by heating for 3 hours under vacuum. The products were collected in traps maintained at 0° C. In a typical run, 100 gm. (1.513 mole) of 1,2 - dichloro - 3,3,4,4 - tetrafluorocyclobutene - 1 was passed through the heated tube together with a four-fold excess (5 moles) of hydrogen bromide. The crude reaction products were washed with an aqueous sodium bicarbonate solution, then with water, and, finally, dried over anhydrous magnesium sulfate. Subsequent distillation at atmospheric pressure afforded 31.2 gm. (25.4 percent of theory) of 1 - bromo - 2 - chloro - 3,3,4,4 - tetrafluorocyclobutene-1, B.P. 81°/630 mm. (lit. B.P. 79.4°/626 mm.) and 56.9 percent (39.2 percent of theory) of 1,2 - dibromo - 3,3,4,4 - tetrafluorocyclobutene - 1, B.P. 96°/630 mm. (lit. B.P. 95–96°/626 mm.).

EXAMPLE 2

Preparation of 1,2-dihalotetrafluorocyclobutene

A mixture of 39.0 gm. (0.20 mole) of 1,2-dichlorotetrafluorocyclobutene-1, 66.4 gm. (0.40 mole) of potassium iodide, and 50 ml. of DMF was refluxed for 5 hours. At the end of this time, the reaction mixture was worked up in the manner described above to yield 20.3 gm. (35.6 percent of theory) of 1-iodo - 2 - chlorotetrafluorocyclobutene-1, B.P. 48°/70 mm. (lit. B.P. 48°/70 mm.) and 14.8 gm. (20 percent) of 1,2-diiocotetrafluorocyclobutene-1, B.P. 148°/623 mm. (lit. B.P. 151.5°/632 mm).

EXAMPLE 3

Preparation of octafluoro - 2,7 - dimercuritricyclo-deca-1,3-diene having the formula:

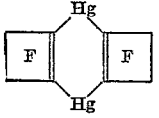

A solution of 9.7 gm. (0.025 mole) of 1,2-diiodotetrafluorocyclobutene in 75 ml. of anhydrous diethyl ether in a 250 ml. reaction vessel equipped with two reflux condensers (the first topped with a gas inlet tube, the other with a drying tube filled with indicating Drierite), a magnetic stirring assembly, and a serum cap was cooled to −75° C. (Dry Ice-acetone bath). Methyl lithium (22.5 ml. of 2.15 M in diethyl ether) was added in a dropwise manner by means of a syringe. The addition took 10 minutes and the temperature was not allowed to rise above 65° C. After the addition was completed, the reaction mixture was stirred for an additional 50 minutes at −75° C. and then 6.8 gm. (0.025 mole) of mercuric chloride was added and stirred for an additional 10 minutes, after which the mixture was allowed to reach gradually to room temperature and then drowned in water. The organic layer was separated, dried over anhydrous magnesium sulfate and the solvent removed in a rotary evaporator. The crude solid product upon recrystallization from n-hexane, yielded 11.2 gm. (68% of theory) of octafluoro - 2,7 - dimercuritricyclo deca-1,3-diene, M.P. 100–101° C.

EXAMPLE 4

Preparation of bis(2 - chlorotetrafluorocyclobutene-1-yl)-mercury having the formula:

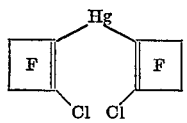

A solution of 14 gm. (0.05 mole) of 1-iodo-2-chlorotetrafluorocyclobutene in 100 ml. of anhydrous diethyl ether contained in the reaction vessel as described in Example 3 was cooled to −75° C. Methyl lithium (11.3 ml. of 2.15 M in diethyl ether) was added in a dropwise manner by means of a syringe. The addition took 10 minutes and the temperature was not allowed to rise over −65° C. After the addition was completed, the reaction mixture was stirred for an additional 50 minutes at −75° C. and then 9 gm. (0.025 mole) of mercuric bromide was added. After the reaction mixture was stirred for an additional 10 minutes, the reaction mixture was allowed gradually to reach room temperature and the product washed with water. The organic layer was separated, dried over anhydrous magnesium sulfate and the solvent was removed in a rotary evaporator. The crude solid product was recrystallized from n-hexane, to yield 16.2 gm. (63% of theory) of bis(2 - chlorotetrafluorocyclobutene-1-yl)-mercury, M.P. 140–141° C.

EXAMPLE 5

Preparation of bis(2 - chlorohexafluorocyclopentyl) mercury having the formula:

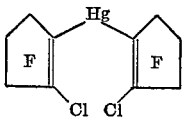

A solution of 12.3 gm. (0.05 mole) of 1,2-dichlorohexafluorocyclopentene in 100 ml. of anhydrous diethyl ether contained in the reaction vessel described in Example 3 was cooled to −75° C. n-Butyl lithium (20 ml. of 2.46 M in tetrahydrofuran) was added in a dropwise manner by means of a syringe. The addition took 10 minutes. After the addition was complete, the reaction mixture was stirred for an additional 50 minutes at −75° C. and then 6.8 gm. (0.025 mole) of mercuric chloride was added. After the reaction mixture was stirred for an additional 10 minutes, the reaction mixture was allowed to reach room temperature gradually. After a wash with dilute hydrochloric acid, the organic layer was separated and dried over anhydrous magnesium sulfate. The solvent was then removed in a rotary evaporator. The solid crude product was then subjected to recrystallization from n-hexane yielding 17 gm. (56% of theory) of bis(2 - chlorohexafluorocyclopentenyl)mercury, M.P. 60–61° C.

EXAMPLE 6

Preparation of octafluoro-2,7-tetramethyldigermana tricyclo(6.2.0.0$^{3,6}$)-deca-1(8), 3(6)-diene A solution of 9.7 gm. (0.025 mole) of 1,2-diiodotetrafluorocyclobutene in 80 ml. of anhydrous diethyl ether contained in a reaction vessel was cooled to −75° C. Methyl-lithium (22.5 ml. of 2.15 M in diethyl ether) was added in a dropwise manner by means of a syringe. The addition took 10 minutes and the temperature was not allowed to rise over −65° C. After the addition was completed, the reaction mixture was stirred for an additional 50 minutes at −75° C. and then 4.4 gm. (0.025 mole) of dimethyl germanium dichloride was added. The reaction mixture was stirred for an additional 10 minutes and allowed to reach gradually to room temperature. The product was washed with water, separated, dried over anhydrous magnesium sulfate, filtered, and the solvent removed in a rotary evaporator. The crude solid product was recrystallized from n-hexane, to yield 7.1 gm. (63% of theory) of octafluoro - 2,7 - tetramethyldigermane (6.2.0.0$^{3,6}$)-deca-1(8), 3(6)-diene, M.P. 161–162° C.

*Analysis.*—Calcd. for $C_{12}F_8Ge_2H_{12}$ (percent): C, 31.78; F, 33.54; Ge, 31.85; H, 2.63. Found (percent): C, 31.79; F, 33.69; Ge, 31.64; H, 2.61.

The infrared spectrum of the product showed a strong absorption at 1527 cm.$^{-1}$ which corresponds to an olefinic stretching frequency.

The proton NMR spectrum showed a sharp singlet at $\tau 9.31$ due to $As(CH_3)$ protons.

EXAMPLE 7

Preparation of dodecafluoro-2,8-tetramethyldigermanatricyclo(7.2.0.0$^{3,7}$)-dodeca-1(9), 3(7)-diene A solution of 5.4 gm. (0.0125 mole) of 1,2-diiodohexafluorocyclopentene in 90 ml. of anhydrous diethyl ether contained in a reaction vessel was cooled to −75° C. Methyllithium (11.3 ml. of 2.15 M in diethyl ether) was added in a dropwise manner by means of a syringe. The addition took 7 minutes. The temperature was not allowed to rise over −65° C. After the addition was completed, the reaction mixture was stirred for an additional 60 minutes at −75° C. and then 2.2 gm. (0.0125 mole) of dimethyl germanium dichloride was added. The reaction mixture was stirred again for 15 minutes and then allowed to reach gradually to room temperature. The product was washed with water, separated, dried over anhydrous magnesium sulfate and the solvent removed in a rotary evaporator. The crude solid product was subjected to recrystallization from n-hexane, to yield 4.7 gm. (68% of theory) of dodecafluoro-2,8-tetramethyldigermanatricyclo (7.2.0.0$^{3,7}$)-dodeca-1(9), 3(7)-diene, M.P. 115–116° C.

*Analysis.*—Calcd. for $C_{14}F_{12}Ge_2H_{12}$ (percent): C, 30.32; F, 41.15; Ge, 26.36; H, 2.16.

Found (percent): C, 30.27; F, 41.10; Ge, 26.27; H, 2.12.

The infrared spectrum contained a strong absorption ascribable to an olefinic stretching frequency.

The proton NMR spectrum showed a sharp singlet at $\tau 9.27$ due to $Ge(CH_3)_2$ protons.

EXAMPLE 8

Preparation of octafluoro-2,7-dimethyldiarsenatricyclo-(6.2.0.0$^{3,6}$)-deca-1(8), 3(6)-diene A solution of 9.5 gm. (0.025 mole) of 1,2-diiodotetrafluorocyclobutene in 80 ml. of anhydrous diethyl ether cooled to −75° C. Methyllithium (22.5 ml. of 2.15 M in diethyl ether) was added in a dropwise manner by means of a syringe. The addition took 10 minutes and the temperature was not allowed to rise above −65° C. After the addition was completed, the reaction mixture was stirred for an additional 50 minutes at −75° C. and then 9.0 gm. (0.025 mole) of methylarsenicdiiodide was added. The reaction mixture was then stirred for an additional 15 minutes and allowed to reach gradually to room temperature. The product was washed with water, separated, dried over anhydrous magnesium sulfate and the solvent removed in a rotary evaporator. The crude solid product was recrystallized from n-hexane, to yield 5.3 gm. (52% of theory) of octafluoro-2,7-dimethyldiarsenatricyclo - (6.2.0.0$^{3,6}$) - deca-1(8), 3(6)-diene, M.P. 127–128° C.

*Analysis.*—Calcd. for $As_2C_{10}F_8H_6$ (percent): As, 35.03; C, 28.03; F, 35.51; H, 1.40. Found (percent): As, 35.18; C, 27.94; F, 35.42; H, 1.28.

The infrared spectrum of the compound contained a strong absorption at 1523 cm.$^{-1}$ which corresponds to an olefinic stretching frequency.

The proton NMR spectrum showed a sharp singlet at $\tau 8.41$ due to $As(CH_3)$ protons.

EXAMPLE 9

Preparation of dodecafluoro-2,8-dimethyldiarsenotricyclo-(7.2.0.0$^{3,7}$)-dodeca-1(9), 3(7)-diene A solution of 5.4 gm. (0.0125 mole) of 1,2-diiodohexafluorocyclopentene in 90 ml. of anhydrous diethyl ether contained in a reaction vessel was cooled to −75° C. Methyllithium (11.3 ml. of 2.15 M in dietheyl ether) was added in a dropwise manner by means of a syringe. The addition took 7 minutes and the temperature was not allowed to rise above −65° C. After the addition was completed, the reaction mixture was stirred for an additional 50 minutes at −75° C. and then 4.5 gm. (0.0125 mole) of methyl arsenic diiodide was added. The reaction mixture was stirred for an additional 15 minutes and then allowed to reach gradually to room temperature. The product was washed with water, separated, dried over anhydrous magnesium sulfate and the solvent removed in a rotary evaporator. The crude solid product was recrystallized from n-hexane, to yield 4 gm. (60% of theory) of dodecafluoro-2,8-dimethyldiarsenotricyclo-(7.2.0.0$^{3,7}$)-dodeca-1(9), 3(7)-diene, M.P. 112–113° C.

*Analysis.*—Calcd. for As$_2$C$_{12}$F$_{12}$H$_6$ (percent): As, 28.40; C, 27.27; F, 43.18; H, 1.13. Found (percent): As, 27.27; C, 27.60; F, 43.07; H, 1.02.

The infrared spectrum of the compound contained a sharp absorption at 1538 cm.$^{-1}$ which corresponds to an olefinic stretching frequency.

The protein NMR spectrum showed a sharp singlet at τ 9.1 due to As(CH$_3$) protons.

EXAMPLE 10

A representative compound of the present invention having the formula

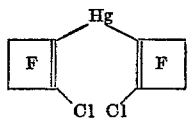

was tested for its effectiveness against urediospores of *Uromyces rumicis*, a rust, and against chlamydospores of *Tilletia foetida*, or stinking smut of wheat, commonly known as "bunt." In each test the compound was compared against at least one control.

As the compounds are not readily soluble in water, they were solubilized in xylene and petroleum ether. Four concentrations of the compound were therefore prepared in the latter solvent (at 1, 10, 100 and 1000 p.p.m.; w./v.), and 1 ml. of each concentration was pipetted onto filter paper squares placed over discs of blotter paper contained in small plastic petri dishes and permitted to air dry until all solvent had evaporated. Spores of the test organism were then dusted onto the mercurial compound-impregnated filter paper square, and 0.9 ml. of water added to the dish to thoroughly wet the paper and blotter.

Percent germination was determined by counting under low power magnification after lifting the filter paper square containing the treated spores from the treatment vessel, mounting on a microscope slide, and staining with lactophenol to distinguish germinated spores from non-germinated spores. Counts of rust spores were made after one day of treatment; smut spores after two days.

The following table shows the percent germination of urediospores (*Uromyces rumicis*) after one day of treatment with various concentrations of the mercurial compound. The concentrations are in p.p.m. active ingredient:

TABLE 2

| Test | Petroleum ether control | 1x | 10x | 100x | 1000x |
|---|---|---|---|---|---|
| A | 59 | 32 | 34 | 23 | 19 |
| B | 67 | 31 | 25 | 45 | 14 |
| C | 59 | 35 | 24 | 39 | 24 |

Table 3 shows the percent germination of chlamydospores (*Tilletia foetida*) after two days treatment with various concentrations of the mercurial compound.

TABLE 3

| Test | Petroleum ether control | 1x | 10x | 100x | 1000x |
|---|---|---|---|---|---|
| A | 45 | 51 | 44 | 31 | <1 |
| B | 47 | 52 | 47 | 39 | <1 |

As seen from the tables, the mercurial compound is effective at 1000 p.p.m. concentration in inhibiting germination of urediospores and in essentially preventing germination of chlamydospores, also indicating its use as a fungicide.

EXAMPLE 11

A compound of the present invention having the formula

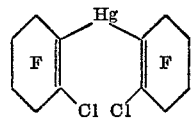

was tested according to a well known procedure for its effectiveness against various microorganisms. The amount of the chemical required to give complete inhibition, partial inhibition or no inhibition of microbial growth on agar plates was determined. The compounds were added to the agar to give final concentrations of 0, 1, 10 and 100 mg./l. The activity of the compound was determined both in the absence and presence of 10% horse serum. Aliquots of broth cultures of each of the species of microorganisms were inoculated onto the agar plates containing the various compound concentrations and the plates were incubated at 37% in a 10% carbon dioxide atmosphere for 18 to 24 hours. The microbial growth on each plate was read visually, the results of which appear in the table below.

TABLE 4

| Organism | Mg./l. dosage | |
|---|---|---|
| | Serum free | With serum |
| Streptococcus SP | 10 | 10 |
| Staphylococcus aureus | 1 | 100 |
| Bacillus subtilis | 10 | 100 |
| Escherichia coli | 100 | 100 |
| Pseudomonas aeruginosa | 10 | 10 |
| Aspergillus niger | 10 | 100 |
| Candida albicans | Ineffective | 100 |

EXAMPLE 12

A compound having the formula

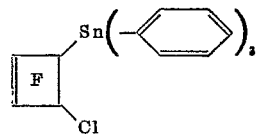

was tested according to the procedure set out in Example 11.

TABLE 5

| Organism | Mg./l. dosage | |
|---|---|---|
| | Serum free | With serum |
| Streptococcus SP | 1 | 10 |
| Staphylococcus aureus | 1 | 10 |
| Bacillus subtilis | 1 | 10 |
| Escherichia coli | Ineffective | 100 |
| Pseudomonas aeruginosa | 100 | 100 |
| Aspergillus niger | 1 | 1 |
| Candida albicans | 1 | 1 |

The compounds of the invention, having two organometallic bonds have, of course, twice as much metal present as the compounds tested above and, consequently, similar or better biocidal results are obtained.

What is claimed is:
1. A compound having the formula

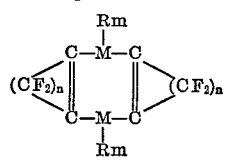

wherein M is selected from the group consisting of mercury, titanium, germanium, tin and lead; R is lower alkyl or phenyl; $m$ is the valence of M minus 2; and $n$ is 2, 3 or 4.

2. The compound having the formula:

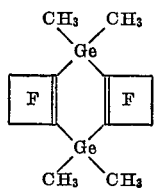

3. The compound having the formula:

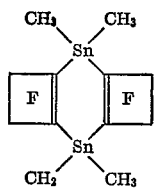

4. A method for preparing a compound having the formula:

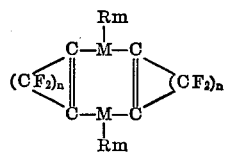

wherein M is selected from the group consisting of mercury, titanium, germanium, tin and lead; R is lower alkyl or phenyl; $m$ is the valence of M minus 2; and $n$ is 2, 3, or 4, comprising the steps of (a) reacting the compound having the formula

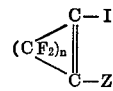

wherein Z is Li or I and $n$ is 1, 2, or 3, with a lithium alkyl at a temperature from about −80° C. to 0° C. for 1–4 hours to produce an organolithium compound;

(b) reacting said organolithium compound with a stoichiometric excess of a compound having the formula

$$R_mMX_2$$

wherein R, M, and $m$ have the above-defined significance and X is halogen and (c) isolating the product.

References Cited

UNITED STATES PATENTS

| | | | |
|---|---|---|---|
| 3,419,590 | 12/1968 | West et al. | 260—431 |
| 3,644,501 | 2/1972 | Park et al. | 260—648 F |

OTHER REFERENCES

Gilman et al.: J. Am. Chem. Soc. 82 (1960), pp. 3605–8.

Cohen et al.: J. Orgmetal. Chem. 12 (1968), pp. 341–7.

Park et al.: Abstracts, American Chemical Society, 158th meeting Sept. 7–12, 1969.

DANIEL E. WYMAN, Primary Examiner

A. P. OEMERS, Assistant Examiner

U.S. Cl. X.R.

260—429.5, 429.7, 431, 435; 424—287, 288, 291, 293, 297